United States Patent

[11] 3,573,367

[72] Inventor Mervin W. LaRue, Jr.
Barrington, Ill.
[21] Appl. No. 723,688
[22] Filed Apr. 24, 1968
[45] Patented Apr. 6, 1971
[73] Assignee Ampex Corporation
Redwood City, Calif.

[54] CAMERA FOCUSING MEANS
13 Claims, 8 Drawing Figs.
[52] U.S. Cl. .................................................. 178/7.92,
178/7.2
[51] Int. Cl. .................................................. H04n 5/26
[50] Field of Search ........................................ 178/7.2
(E), 7.92; 350/187, 186; 95/45

[56] References Cited
UNITED STATES PATENTS
2,532,685 12/1950 Walker ........................ 350/187
2,532,684 12/1950 Walker ........................ 350/187
2,547,187 4/1951 Walker ........................ 350/187

Primary Examiner—Richard Murray
Attorney—Anderson, Luedeka, Fitch, Even and Tabin ABSTRACT: An image tube position mechanism is provided for a television camera which includes a carrier for supporting the image tube for longitudinal movement toward or from a lens disposed immediately in front of the image tube as an operator manipulates a manually operable knob mounted on the camera. The knob is connected to the carrier by a focus control mechanism which achieves a similar change in focus with a given turning movement of the knob irrespective of whether or not the object is near or far with respect to the lens.

PATENTED APR 6 1971

Inventor
Mervin W. LaRue Jr.
Anderson, Luedeka, Fitch, Even, & Tabin
Attorneys

Inventor
Mervin W. LaRue Jr.
Anderson, Luedeka, Fitch, Even, & Tabin
Attorneys

COMPARISON OF FOCUS CONTROL MECHANISMS

Inventor
Mervin W. LaRue Jr.

Anderson, Luedeka, Fitch, Even & Tabin
Attorneys

CAMERA FOCUSING MEANS

This invention relates to an image tube positioning mechanism for a television camera and more particularly to a focus control mechanism in a television camera for focusing an image on an image tube.

Normally, in a television camera, to bring an object into focus, the operator of the television camera causes the image tube to move relative to an objective lens. Such an operator can more easily maintain proper focus as the object moves and the object distance changes if a single operating knob is involved and if a given movement of the operating knob results in a relatively uniform change in focus to the operator's view. However, in presently available television cameras a given change of object distance near infinity requires only a small movement of the image tube relative to the objective lens. On the other hand, much larger movements of the image tube are required for the same change of object distance when the object is near the camera.

An object of the present invention is to provide a positioning mechanism for an image tube in a television camera which mechanism moves the image tube nonlinearly with a given manual movement to compensate automatically for object distance changes near infinity or near the camera.

Another object of the invention is to provide an image tube positioning mechanism which is relatively free of backlash or looseness and which is self-adjusting to compensate for wear in the positioning mechanism.

Other objects and advantages of the invention will become apparent from the detailed description taken in connection with the accompanying drawings in which.

Figure 1:
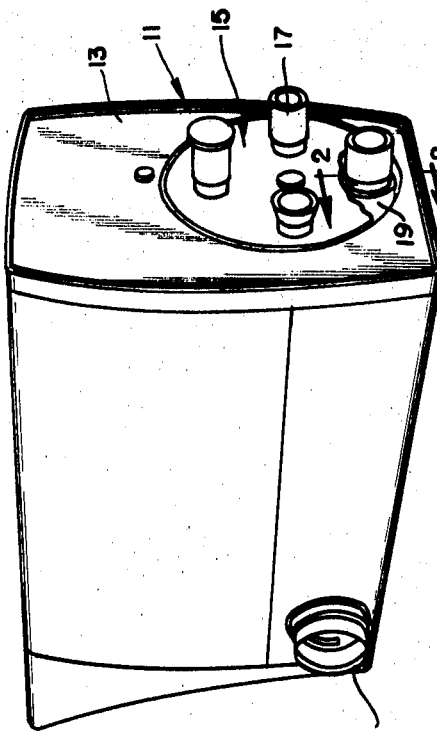
FIG. 1 is a perspective view of a television camera embodying the invention.
Figure 2:
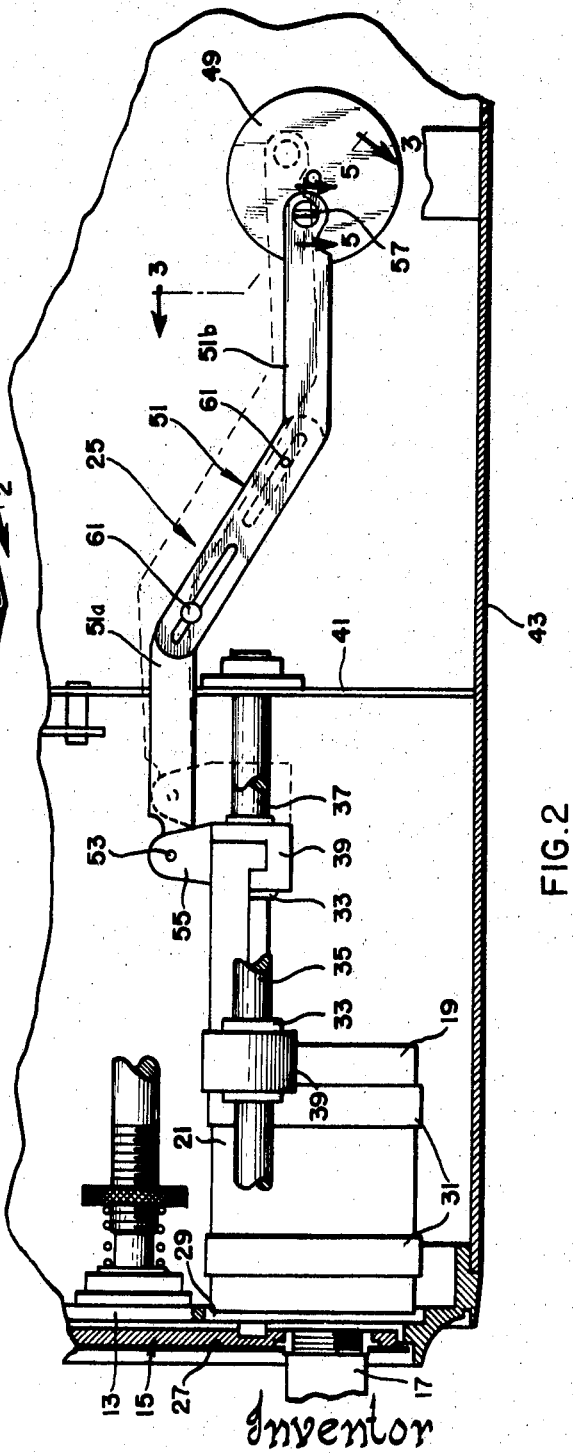
FIG. 2 is an enlarged fragmentary, longitudinal sectional view taken generally along line 2-2 of FIG. 1.
Figure 6:
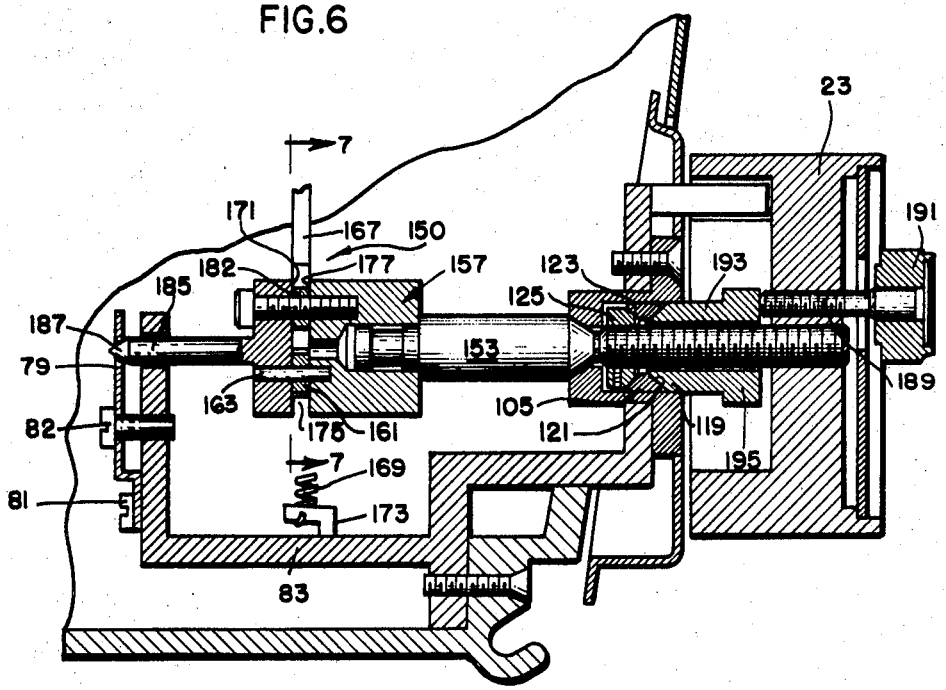
FIG. 6 is an enlarged fragmentary, sectional view of another embodiment of the invention.

Very generally, the illustrated television camera 11 has an outer housing with a front wall 13 on which is mounted a rotatable lens turret 15. The lens turret is rotated to swing each of a series of lenses 17 into position in front of an image tube 19 (FIGS. 1 and 2) which extends longitudinally and rearwardly from the front housing wall 13 as best seen in FIG. 2. The image tube 19 together with its electrical deflection and focusing means (not shown), is supported in a carrier 21 for longitudinal movement toward or from the lens 17 disposed immediately in front of the image tube as an operator manipulates a manually operable member or knob 23 (FIG. 1) mounted on the sidewall of the housing 11. The knob 23 is connected to the carrier 21 by a focus control mechanism 25 (FIGS. 2—5) which achieves a relatively similar change in focus with a given turning movement of the knob 23 irrespective of whether or not the object is near or far. According to another embodiment of the invention, a modified focus control mechanism 150 (FIG. 6) may be used in lieu of the focus control mechanism 25.

Proceeding now with a more detailed description, the television camera includes four outer lens 17 and these are carried by the lens turret 15 which includes a circular plate 27 rotatably mounted in a recess in the front wall of the housing 11 of the camera. The lens turret 15 is rotated by means (not shown) to position a selected one of the lenses 17 in front of an opening in the front wall of the housing 11. As shown in FIG. 2, the image tube 19, which may be a conventional vidicon tube, is carried by the image tube carrier 21, the tube being mounted by suitable means such as hose clamps 31 in depending relation to the carrier.

Figure 3:
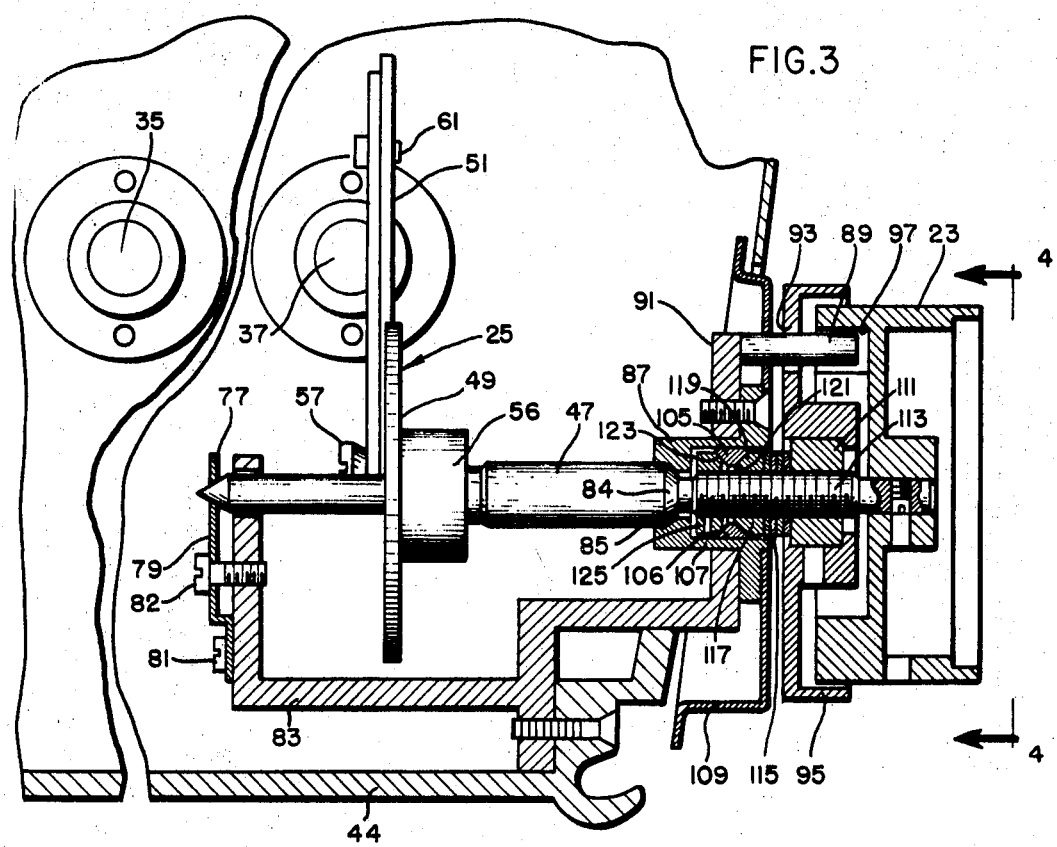
FIG. 3 is an enlarged fragmentary, sectional view taken substantially along the line 3-3 of FIG. 2.
Figure 4:
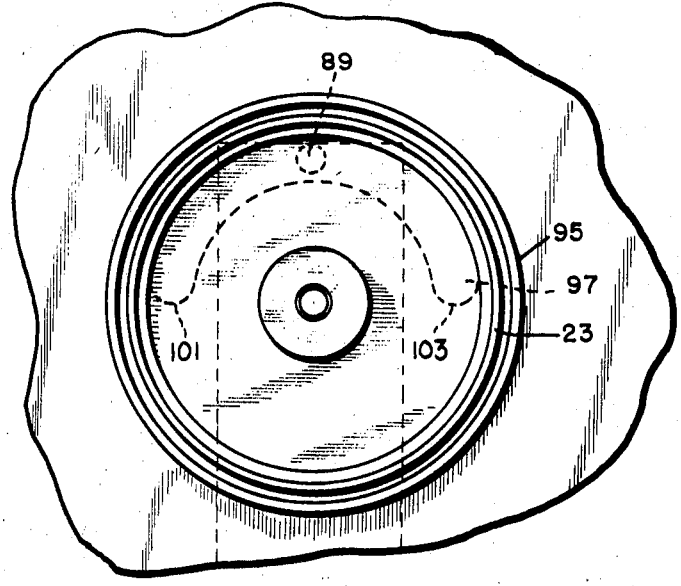
FIG. 4 is a view taken along the line 4-4 of FIG. 3.
Figure 5:
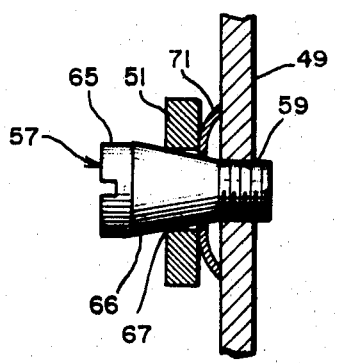
FIG. 5 is an enlarged sectional view taken along line 5-5 of FIG. 2.

The carrier 21 is mounted for free and easy sliding movement by three ball bushings 33 (only two are shown) encircling and rolling on a pair of parallel precision ground shafts 35 and 37 (FIGS. 2 and 3). The carrier 21 includes a plate-type body (FIG. 2) disposed over and spanning across the shafts 35 and 37 with the bushings disposed in tubular members 39 fastened to the plate, two at either end of one side and one on the other side intermediate the ends.

Each of the shafts 35 and 37 for the carrier 21 has one end fastened to the front housing wall 13 and its opposite end fastened to a depending plate 41 fixed to the camera housing 11. The shafts are disposed generally parallel to a bottom housing wall 43 and extend generally horizontally. The shafts guide the carrier 21 and image tube 19 during focusing movement and align the optical axis of the image tube with the optical axis of that lens 17 which is in operative position before the image tube 19.

The focus control mechanism 25 for shifting the image tube carrier 21 includes an operating shaft 47 (FIG. 3) connected at one end to the focus knob 23 to turn with the knob. An eccentric 49 is fastened to the operating shaft 47 for driving a connecting rod in the form of a link 51 (FIG. 2) extending from the eccentric to a pivot pin 53 in an upstanding post 55 at the rear of the image tube carrier 21. The eccentric 49 functions to convert the rotary motion of the shaft 47 to a linear movement for the image tube carrier 21 and also, as will be explained, to provide a variable ratio movement for the carrier depending on its position.

In the embodiment of FIGS. 2—5, the eccentric 49 includes a circular disc fixed on the shaft 47 by a collar 56 (FIG. 3). A pin 57, such as that shown in FIG. 5, interconnects the rear end of the adjustable link 51 with the disc 49 for movement with the disc during its turning by the shaft 47. The pin 57 is received in a threaded hole 59 in the disc 49. Several other threaded holes may be provided in the disc to receive the pivot pin 57 if a different displacement is desired. In this embodiment of the invention, the hole 59 is offset at a ½ inch radius, and several other holes (not shown) are provided at radii of 1 and 2 inches. The maximum displacement of the carrier 21 may be increased by connecting the link pivot pin 57 to one of these other holes and thereby increasing the throw of the eccentric, that is the radius of eccentricity.

When the disc 49 and link 51 are in the solid-line position shown in FIG. 2, the pivot pin 57 is at the limit of its leftward travel with its axis in a line connecting the center of the pivot pin 53 and the axis of the shaft 47. The maximum rightward travel or link displacement possible would be equal to twice the radius between the pin 57 and the axis of the shaft 47 if the pin 57 were turned 180° from the solid-line position of FIG. 3. As will be explained, the turning of the knob 23 is limited, however, to about 120° in this first embodiment of the invention and, hence, the link displacement is limited to less than twice of the eccentric. Initial turning of the disc 49 in the clockwise direction from the solid-line position (FIG. 2) causes relatively little horizontal movement of the pin 57 as it is moving mostly upward, that is, the pin partakes of a movement with a large vertical component and a very small horizontal component. Consequently, the image carrier 21 receives only a slight displacement. As the disc 49 continues to turn, however, a greater movement of the link is effected in the horizontal direction and a relatively smaller movement in the vertical direction until the disc 49 rotates through to the 120° position, at which the carrier 21 is at the dotted line, i.e., at the near object position. If the disc 49 were allowed to continue turning beyond the 120° position, the horizontal component of displacement would begin to decrease rapidly as the disc continued to the 180° position. Hence, the disc 49 is preferably limited in its turning after about 120°, at which position the horizontal displacement of the link 51 is still significantly large for a given turning of the disc as compared to the horizontal displacement of the link for a similar turning of the disc when it is at or adjacent the solid-line position. Thus, a turning of the knob 23 through a predetermined number of degrees results in a substantially greater horizontal movement of the adjusting link 51 from its dotted line (near-object) position than will a similar turning movement through the same number of degrees when the adjusting link is in the solid-line (infinity) position of FIG. 2.

To allow the user to adjust the ultimate leftward movement of the image tube carrier 21, i.e., to adjust its infinity position, it is preferred to make the link 51 adjustable by providing two separate, slideable portions which are releasably clamped together. An upper and forward portion 51a of the link is substantially identical to the rear portion 51b of the link. The overlapping link portions are disposed flat against one another and locking screws 61 are inserted through a slot in each link portion and are threaded into the opposite link. To adjust the length of the link, both of the screws 61 are loosened and the link portions are slid relative to one another to lengthen or shorten the distance between the pivot pins 53 and 57, whereupon the screws may be tightened to lock the link at its adjusted length.

The pivot pins 53 and 57 are identical in construction and they prevent any looseness or backlash from occurring at the link pivots which would adversely affect movement of the carrier 21. The link pivot pins 53 and 57 preferably include a screw 65 (FIG. 5) having a tapered or frustoconical surface 66 of a size considerably larger than that of a hole 67 in the link 51 or the threaded hole 59 in the disc 49. A flexible spring washer 71 is disposed between the link 51 and disc 49 to bias the wall forming the hole in the link into intimate contact with the conical surface 66. Should the holes in the link 51 enlarge due to wear, the conical surface 66 will automatically shift axially into the enlarged hole to maintain a tight intimate contact with the link 51.

To prevent axial or radial shifting of the operating shaft 47 which would adversely affect the ultimate positioning of the image tube 19, it is preferred to bias the shaft 47 against locating surfaces. To this end, the interior end of the operating shaft 47 is formed with a conically shaped point 77 (FIG. 3) extending into a small hole in a leaf spring 79 fastened by a threaded screw 81 to a support base 83 which is fastened to the bottom housing wall 44. The spring force is directed in the axial direction outwardly along the shaft 47 and can be increased by threading an adjusting screw 82 further into the base 83 to force the spring more tightly against the point of the shaft.

The leaf spring 79 forces the operating shaft 47 toward the sidewall of the housing 11 and abuts a frustoconical or tapered shoulder 84 on the shaft 47 into tight frictional engagement with the conical-shaped seat 85 on a hollow, cylindrical boss 87 fastened to the base member 83. The abutted conical surfaces 84 and 85 thus serve to hold the operating shaft against axial movement to the right, as viewed in FIG. 3. Also, it will be appreciated that the conical surfaces 84 and 85 prevent play in the radial direction which also would afford looseness or backlash in the adjusting mechanism.

In the preferred embodiment of the invention, there is provided means to limit the amount of rotation of the focus control knob 23 so that it can be quickly turned to and stopped at an infinity position, or, alternatively, turned to and stopped at a near-object position. In this instance, a stop is provided in the form of a horizontally extending pin 89 (FIG. 3) fixed to a vertical support plate 91 on the base 83. The pin 89 extends generally horizontally to and through an arcuate slot 93 formed in a locking ring 95 into an arcuate slot 97 formed in the rear wall of the focus control knob 23. As best can be understood from FIG. 4, turning of the knob in one direction brings one end of the slot 101 (FIG. 4) against the stop pin 89 whereas turning through approximately 120° will bring the other end 103 of the arcuate slot against the stop pin 89. Since the stop pin directly engages the knob, there is no strain exerted on the shaft 47 or the link pivots which would tend to loosen them.

The locking ring 95 (FIG. 3) is in the form of a generally circular disc disposed intermediate the knob 23 and a circular cover plate 109 fastened to and carried by the sidewall of the housing 11. To lock the focus control mechanism at any given position, the locking ring 95 (FIG. 3) is turned in a clockwise direction to thread it axially and leftward on the shaft 47 and cause a split, braking ring 105 to expand against an interior encircling cylindrical wall 106 of a sleeve 107 integral with the stationary boss 87. The locking ring 95 is disposed on and fastened by a setscrew to an internal nut 111 threaded on a thread 113 on the surface of the operating shaft 47. Turning of the locking ring and nut clockwise moves the nut axially to the left to force a series of washers 115 on the shaft 47 against a brake cone 117 also freely mounted on the shaft 47 for sliding leftward to engage the split braking ring 105. The free sliding cone 117 is provided with a tapered or conical face 119 for abutment against a mating conical tapered surface 121 on the split braking ring. A similar face 121 is provided on the other side of the braking ring for engagement with a tapered or conical face 123 on a cone 125 suitably fixed to the shaft 47 as by a setscrew. As the slidable brake cone 117 moves leftwardly and abuts the braking ring 105 on the tapered surface on the fixed cone 125, these tapered surfaces wedge the braking ring to expand its diameter and abut its outer surface 127 against the inner sleeve wall 106 at which time the braking ring acts through the fixed cone 125 to hold the shaft 47 against turning. To unlock the focus control knob 23, the locking ring 95 is turned in direction to move the nut 111 to the right as viewed in FIG. 3 whereby the split braking ring 105 is free to contract due to its own resiliency and slide the movable cone 117 and washer 115 rightward on the shaft. The split ring 105 contracts sufficiently to space its outer surface 127 from the wall 106 of the sleeve.

As an aid to understanding this embodiment of the invention, a brief operation will be described. The operator viewing the screen at the rear wall of the camera will place his right hand on the focus control knob 23 and as the object moves toward the camera, the operator will turn the knob to adjust the focus. Irrespective of whether or not the object is located near the camera or at a considerable distance from the camera, operation of the knob 23 through a given number of degrees of turning, for example, 10°, will result in about the same visual change in focus to the eye of the operator. The actual amount of movement of the image tube 19 and image carrier 21 relative to the lens 17, however, will vary considerably depending upon whether or not the carrier 21 is near the solid-line position or in the dotted line position of FIG. 2. For a 10° rotation of an operating knob when the image carrier is in the solid-line position, most of the movement of the shaft 47 and disc 49 results in a generally vertical movement of the pivot pin 57 with a slight horizontal displacement of the pin 57, link 51 and image tube carrier 21. Thus, the adjustable link 51 will be shifted only slightly to the rear as seen in FIG. 2. On the other hand, when the disc, link and image tube carrier are in the dotted line position shown in FIG. 2, a 10° disc rotation in the clockwise direction results in a much larger horizontal displacement of the image tube carrier 21.

A stop pin 89 is inserted into a groove 97 (FIG. 4) in the focus control knob 23 and limits its turning to about 120°. Once the object is in focus, the operator may turn an outer locking ring 95 in a direction to thread it on the support shaft 47 to abut conical friction faces on the cones 121 and 125 against faces on the split braking ring to expand the latter to engage its outer surface with the encircling wall 108. Frictional engagement between the stationary wall 108, split ring 105 and fixed cone 125 hold the image tube against movement as the camera is tilted or swung from position to position.

In accordance with a further and preferred embodiment of the invention, a focus control mechanism 150 is used in lieu of the focus control mechanism 25 to move the carrier 21 at a rate of travel which is slower than the travel rate for the focus control mechanism 25 and also to allow turning the operating shaft through a larger arc than with the focus control mechanism 25. It will be recalled that with the focus control mechanism 25, the knob 23 and the operating shaft 47 were limited to about 120° of turning as the carrier 21 moved between the infinity and the near object positions. However, some operators prefer that there be a slower, but still nonlinear carrier displacement with rotation of the knob when the carrier is adjacent the infinity position. As will be explained, the focus control mechanism 150 causes the carrier 21 to travel in a manner illustrated graphically by a solid-line curve 151 (FIG. 8) for a 240° turning of the knob 23 and an attached operating shaft 153 (FIG. 6) which is similar to the previously described operating shaft 47. In contrast, the focus control mechanism 25 would provide a similar total displacement, but in a manner illustrated graphically by a dotted line curve 155, during 120° of turning of the operating shaft 47 by the knob 23. The present invention is not limited to these preferred displacement characteristics as illustrated by the curves in FIG. 8, as these curves are only for the purposes of illustration.

In this instance, the focus control mechanism 150 includes a disc 157, which is generally similar to the disc 49, and includes an associated gear mechanism 159 (FIG. 7) which is effective to cause a displacement of the carrier 21. In this instance, the gear mechanism includes a spur gear 161 secured by a pin 163 to the disc 157 at a position eccentric to the axis of rotation of the operating shaft 153, and also includes a cooperating rack 165 carried on an end of a link 167, which is similar to the rear portion of the link 51. The rear link 167 is fastened by screws 61 in the manner previously disclosed to the front link portion 51a, which, in turn, is connected by the pivot pin 53 to the carrier 21. In this instance, the spur gear has a pitch circle which intersects the axis of the operating shaft 153. The rack 165 on the link 167 is meshed with the gear 161 and, as the disc turns with the shaft, the teeth of the nonrotatable spur gear force the rack 165 to move and thereby shift its attached link 167 and the carrier 21.

To hold the rack 165 and gear 161 in meshing engagement, there is provided a biasing means which may be in the form of a contractile spring 169 (FIG. 7) which is fastened at its upper end to a depending lug 171 on the link 167 and fastened at its lower end to a spring hanger 173 secured to the base 83. The contractile spring 169 biases the link downwardly and rearwardly to assure that the rack remains in engagement with the gear as it moves arcuately about the axis of the shaft 153. The spring 169 also serves to prevent backlash between the gear 161 and the rack 165.

It is preferred to guide the rack 165 and the rear end of the link for movement along a relatively straight-line path which is parallel to the path of movement for the carriage 21. A suitable guide means for the rack is provided by disposing the rack in a narrow slot 175 (FIG. 6) defined by a face 177 of the eccentric disc 157 and a spaced, opposing face 179 of a guide member 181 fixed to the face of the eccentric disc 157 by the pin 163 and a suitable screw 183. A spacer ring 182 (FIGS. 6 and 7) encircles the screw 183 and its opposite ends abut the faces 177 and 179. The ring 182, is slightly wider than the rack 165 and spaces the faces 177 and 179 so that the slot 175 is also slightly wider than the rack 165. As the opposing faces 177 and 179 are generally normal to the axis of the operating shaft 153, the rack is guided for and limited to movements which are substantially normal to longitudinal axis of the operating shaft 153.

The guide member 181 serves to support the left end of the operating shaft 153 for turning, and to this end, is provided with an integral pin 185 disposed coaxially with the shaft 153. A conical point 187 on the pin 185 extends partially into a hole in the leaf spring 79. The leaf spring 79 supports the conical point 187 and, hence, the operating shaft 153 and also limits any possible inwardly directed, axial movement due to a pushing force on the knob 23. Also, spring 79 holds the conical point 187 against radially directed movement as previously described in connection with the operating shaft 47.

Although the locking ring 95 (FIG. 3) described hereinbefore in conjunction with the first-described embodiment of the invention has proven generally satisfactory, it is preferred to provide another form of locking means such as a smaller locking pin 189 (FIG. 6) threaded in the knob 23. Briefly, the locking pin 189 includes a small button 191 fixed to an outer free end of a threaded shaft positioned at a location outwardly of the rotatable knob 23. The locking pin is threaded in the web of the knob 23 and upon being turned by the operator to move inwardly, it forces the split braking ring 105 into its braking position to hold the shaft 153 against turning. More specifically, the inner end of the locking pin 189 abuts a flanged end 195 of a slideable sleeve or braking cone 193, slideably mounted on the operating shaft 153. The braking cone 193 is provided with the conical or tapered face 119 for engaging the mating surface 121 on the split braking ring 105. When the locking pin is moved to the left in FIG. 6, it forces the sleeve 193 to slide leftwardly and abut the face 123 of the braking cone 125 with such frictional force therebetween that the operating knob 23 is held against turning. Upon the operator turning the locking pin 189 to move its inner end rightwardly, the split braking ring 105 (which had expanded in its braking position), is free to contract and force the sleeve 193 to the right with the result that the braking ring 105 is no longer in tight frictional engagement with fixed braking cone 125. Thus, the knob 23 and operating shaft 153 are free for easy turning movement to cause a displacement of the carrier 21.

Figure 7:
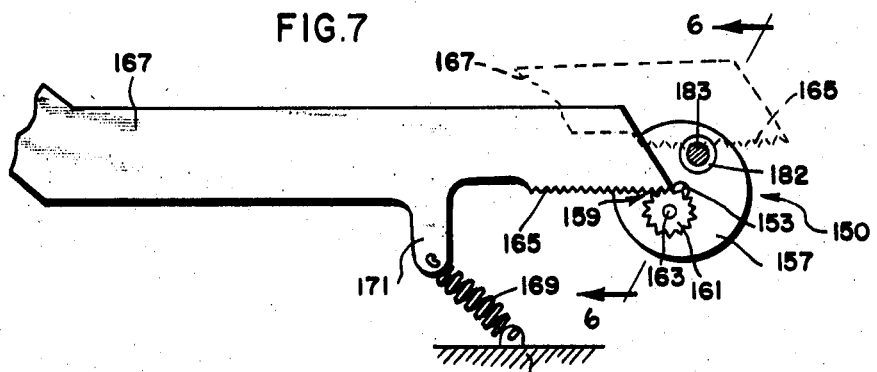
FIG. 7 is a fragmentary, sectional view taken along the line 7-7 of FIG. 6 and in the direction of the arrows.
Figure 8:
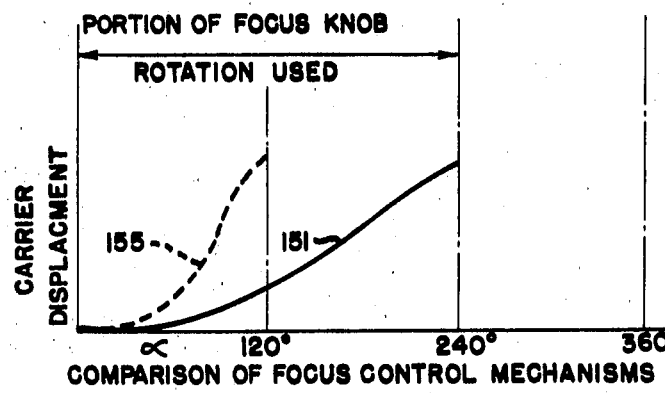
FIG. 8 is a graphic illustration of displacement curves for the respective illustrated embodiments of the invention.

In operation of this latter-described embodiment of the invention, the initial turning of the knob 23 and shaft 153 causes the gear 161 to travel in a clockwise direction as seen in FIG. 7 from a position (shown in solid lines) in which the carrier is at its infinity position toward a position (shown in dotted lines) in which the gear has moved through 180° and is now closer to its 240° position (not shown) at which the carrier will be at its near-object position. During initial movement of the gear 161 from its solid-line position of FIG. 7, the mechanical ratio between angular displacement of the focus knob and the displacement of the carrier 21 is about double that for the previously described eccentric 49, as will be seen from a comparison of the right-hand portions of the curves 151 and 155 (FIG. 8). As can be observed in FIG. 8, this change in mechanical ratio is achieved while maintaining the maximum carrier displacement substantially constant. Also, the focus control mechanism 150 retains the highly desirable, nonlinear characteristics of the focus control mechanism 150.

From the foregoing it will be seen that the focus control mechanism is relatively simple and inexpensive in construction yet is precise and accurate in its movement of the image tube through relatively large or small distances. The pivot pin connections 53 and 57 and the shaft mountings are so constructed as to be free of backlash or looseness which would interfere with the precise movement of the image tube and focus adjustment by the focus control knob.

While a preferred embodiment has been shown and described, it will be understood that there is no intent to limit the invention by such disclosure but, rather, it is intended to cover all modifications and alternate constructions falling within the spirit and scope of the invention as defined in the appended claims.

I claim:

1. In a television camera, a frame having a guide means, an image tube, an image tube carrier guided by said means for movement along a predetermined, linear path of travel for shifting and carrying therewith said image tube between an infinity focusing position and a near-object focusing position, a manually operable member mounted on said frame for turning manipulation by an operator during televising operations to cause said image tube carrier to move said image tube along said path between said infinity position and said near object position, a shaft fixed to said manually operable member and mounted for turning with operation of said manually operable member during televising, and means connecting said shaft and said carrier for converting a rotational movement of said shaft to a linear movement of said carrier, said means moving said image tube carrier through a predetermined distance with a turning of the manually operable member through a predetermined angular movement when the said carrier is at or adjacent said near-object focusing position and moving said carrier through a lesser distance for the same amount of angular movement when said carrier is at or adjacent the infinite focusing position whereby focusing of said camera is facilitated.

2. An apparatus in accordance with claim 1 in which the means connecting said shaft to said carrier includes eccentric means movable by said shaft through a path eccentric to the axis of said shaft, and in which the component of movement of said eccentric means parallel to the direction of carrier travel for a given turning movement of said shaft is greatest when the carrier is adjacent the near object focusing position.

3. An apparatus in accordance with claim 2 in which said means connecting said shaft to said carrier includes a link pivotally connected at one end to said carrier and connected at its other end to said eccentric means.

4. An apparatus in accordance with claim 3 in which said eccentric means includes a disc fixed to and rotatable about a longitudinal axis for said shaft and the pivotal connection of said link is rotatably mounted on said disc at a position which is offset from the axis of said shaft.

5. An apparatus in accordance with claim 4 in which a pivot pin with a tapered surface is disposed to pivotally mount the link to said disc and the link is provided with an opening which cooperates with the tapered surface and the apparatus further includes a spring biasing the link so that the wall forming said opening remains fully engaged with the tapered surface whereby said pivotal mount is automatically adjusted for wear and backlash is eliminated.

6. An apparatus in accordance with claim 1 in which the means connecting said shaft to said carrier includes a gear mechanism having a meshed rack and gear operable by said shaft to convert its angular movement into linear movement for said carrier.

7. An apparatus in accordance with claim 1 in which said means connecting said shaft to said carrier includes a disc fixed at its center to said shaft and in which a gear is mounted on said disc eccentrically of the longitudinal axis of said shaft and in which a link is connected to said carrier and carries a rack meshed with and driven by said gear.

8. An apparatus in accordance with claim 7 in which means bias said rack and gear into engagement and in which means are provided to guide said rack for movement along a path substantially parallel to the path of carrier travel.

9. An apparatus in accordance with claim 2 in which means are provided to lock said carrier against movement from a given focus.

10. An apparatus in accordance with claim 2 in which said frame and said shaft are provided with mating conical surfaces and in which a spring biases said shaft longitudinally to abut said mating surfaces and thereby hold said shaft against radial and longitudinal movement.

11. An apparatus in accordance with claim 4 in which said link is adjustable in length so that the infinity and near object positions of the carrier may be adjusted.

12. In a television camera, a housing having front, rear and sidewall, a rotatable lens turret having a lens positioned on said front housing wall, an image tube, an image tube carrier disposed adjacent said lens, means in said housing to guide said carrier for travel relative to said lens and to maintain the optical axes of the lens and said image tube aligned, and a focus control means including a manually turnable member for turning by a camera operator during a televising operation and for converting rotational movement of said member into a linear movement of said carrier, said focus control means further including an eccentric interconnecting said manually turnable member and said carrier, said eccentric being disposed to have an increasing component of movement in the direction parallel to said carrier movement during initial movement of said carrier from an infinity focusing position for said carrier.

13. In a television camera, a housing having front, rear and sidewalls a rotatable lens having a lens positioned on said front housing wall, an image tube, an image tube carrier disposed for movement relative to said lens, means for guiding said image carrier for rectilinear movement within said housing, means in said housing to guide said carrier for travel relative to said lens and to maintain optical axes of the lens and said image tube in alignment, a manually turnable member accessible at one of said sidewalls of said housing for turning by a camera operator during a televising operation, a shaft fixed to said manually turnable member and mounted for turning therewith, means for converting said turning movement of said shaft into linear movement of said carrier and image tube and including eccentric means fixed to said shaft for rotation therewith, link means connected at one end to said eccentric means and at an opposite end to said carrier for moving said carrier along said guide means with turning of said shaft and said eccentric means, said means for converting said turning movement providing an increasing component of movement in the direction parallel to said carrier movement for focusing when an object is adjacent a near-object focusing position than when the object is at or adjacent an infinite focusing position; and means for frictionally exerting forces on said shaft and link means to maintain the positions of said converting means and said shaft relative to each other to prevent backlash and looseness which would interfere with precise movement of said carrier with turning of said shaft.